US 9,227,466 B2

United States Patent
Endo et al.

(10) Patent No.: US 9,227,466 B2
(45) Date of Patent: Jan. 5, 2016

(54) PNEUMATIC TIRE

(75) Inventors: Toyoaki Endo, Hiratsuka (JP); Yoshiaki Hashimura, Hiratsuka (JP); Hideki Seto, Hiratsuka (JP); Jun Matsuda, Hiratsuka (JP); Yuichi Hara, Hiratsuka (JP)

(73) Assignee: THE YOKOHAMA RUBBER CO., LTD., Tokyo (JP)

( * ) Notice: Subject to any disclaimer, the term of this patent is extended or adjusted under 35 U.S.C. 154(b) by 257 days.

(21) Appl. No.: 13/996,763

(22) PCT Filed: Nov. 25, 2011

(86) PCT No.: PCT/JP2011/077211
§ 371 (c)(1),
(2), (4) Date: Jun. 21, 2013

(87) PCT Pub. No.: WO2012/086365
PCT Pub. Date: Jun. 28, 2012

(65) Prior Publication Data
US 2013/0269852 A1 Oct. 17, 2013

(30) Foreign Application Priority Data

Dec. 24, 2010 (JP) .................. 2010-287352
Apr. 28, 2011 (JP) .................. 2011-102064

(51) Int. Cl.
| B60C 5/14 | (2006.01) |
| B60C 1/00 | (2006.01) |
| B29D 30/30 | (2006.01) |
| B32B 15/04 | (2006.01) |
| B32B 25/04 | (2006.01) |
| B32B 27/06 | (2006.01) |
| B32B 3/30 | (2006.01) |
| B29D 30/06 | (2006.01) |

(52) U.S. Cl.
CPC .......... *B60C 1/0008* (2013.04); *B29D 30/3028* (2013.01); *B32B 3/30* (2013.01); *B32B 15/04* (2013.01); *B32B 25/04* (2013.01); *B32B 27/06* (2013.01); *B60C 5/14* (2013.01); *B29D 2030/0682* (2013.01); *B29D 2030/0683* (2013.01); *B32B 2270/00* (2013.01); *B32B 2274/00* (2013.01); *B32B 2307/7242* (2013.01); *B32B 2605/00* (2013.01); *B32B 2605/08* (2013.01); *B60C 2005/145* (2013.04); *B60C 2005/147* (2013.04)

(58) Field of Classification Search
CPC .......... B60C 1/0008; B60C 5/12; B60C 5/14; B60C 5/142
See application file for complete search history.

(56) References Cited

FOREIGN PATENT DOCUMENTS

| JP | 09-254273 A | 9/1997 |
| JP | 2003-200448 A | 7/2003 |
| JP | 2007-261137 A | 10/2007 |
| JP | 2009-241855 A | 10/2009 |
| JP | 2010-168033 A | 8/2010 |
| JP | 2010-269735 A | 12/2010 |

OTHER PUBLICATIONS

International Search Report of corresponding International Application No. PCT/JP2011/077211, dated on Feb. 21, 2012.

*Primary Examiner* — Justin Fischer
(74) *Attorney, Agent, or Firm* — Global IP Counselors, LLP

(57) ABSTRACT

A pneumatic tire which uses, as an inner liner layer, a laminated sheet obtained by laminating an air permeation preventing layer, made of any one of a thermoplastic resin and a thermoplastic elastomer composition containing a blend of the thermoplastic resin and an elastomer, and a tie rubber layer, and which has high durability to prevent development of a crack in the tie rubber layer that occurs around a splice portion of the laminated sheet after the tire starts to be used. In the pneumatic tire, a sagged portion is formed by a concavo-convex structure in the air permeation preventing layer at least between points P and Q in a shape that a length La of a straight line connecting points P and Q and a length Lb of the air permeation preventing layer actually passing through points P and Q satisfy a relationship of $(1.03 \times La) \leq Lb \leq (1.5 \times La)$.

20 Claims, 4 Drawing Sheets

PNEUMATIC TIRE

CROSS-REFERENCE TO RELATED APPLICATIONS

This U.S. National stage application claims priority under 35 U.S.C. §119(a) to Japanese Patent Application No. 2010-287352, filed in Japan on Dec. 24, 2010 and Japanese Patent Application No. 2011-102064, filed in Japan on Apr. 28, 2011, the entire contents of Japanese Patent Application Nos. 2010-287352 and 2011-102064 are hereby incorporated herein by reference.

BACKGROUND

1. Field of the Invention

The present invention relates to a pneumatic tire.

More specifically, the present invention relates to a pneumatic tire which uses, as an inner liner layer, a laminated sheet obtained by laminating an air permeation preventing layer, made of any one of a thermoplastic resin and a thermoplastic elastomer composition containing a blend of the thermoplastic resin and an elastomer, and a tie rubber layer, and which has high durability making it possible to prevent development of a crack in the tie rubber layer that occurs around a splice portion of the laminated sheet after the tire starts to be used.

2. Background Information

In recent years, pneumatic tires have been proposed and studied which use, as an inner liner layer, a laminated sheet including an air permeation preventing layer, made of a thermoplastic resin or a thermoplastic elastomer composition containing a blend of the thermoplastic resin and an elastomer, and a tie rubber layer Japanese patent application Kokai publication No. 2009-241855.

In general, to manufacture such a pneumatic tire, a manufacturing method is employed in which a laminated sheet including a sheet-shaped object for the air permeation preventing layer made of a thermoplastic resin or a thermoplastic elastomer composition obtained by blending the thermoplastic resin and an elastomer, and including a rubber (tie rubber) sheet to be cured and adhered to the thermoplastic resin or the thermoplastic elastomer composition obtained by blending the thermoplastic resin and the elastomer, is wound around a tire making drum and lap spliced and is then subjected to a tire cure-molding process.

A pneumatic tire may be manufactured by pulling out the laminated sheet, which has been wound into a rolled shape, by a predetermined length from the rolled shape and cutting the laminated sheet in the length, winding the laminated sheet around a tire making drum, lap splicing the laminated sheet on the drum, and further cure-molding the laminated sheet to form an inner liner layer. In this case, however, a crack may be developed around a splice portion after the tire starts to be used, thereby causing in some cases delamination between the sheet of the thermoplastic resin or the thermoplastic elastomer composition and the tie rubber cured and adhered to the sheet of the thermoplastic resin or the thermoplastic elastomer composition, which collectively constitute the inner liner layer.

To explain this with drawings, as shown in FIG. 4(a), a laminated sheet 1 including a sheet 2, made of a thermoplastic resin or a thermoplastic elastomer composition obtained by blending the thermoplastic resin and an elastomer, and a tie rubber layer 3 is cut to a desired size (length) with an edge tool or the like. Then, the laminated sheet 1 is lap spliced on a tire making drum (unillustrated) in such an annular shape that both end portions thereof form a lap splice portion S. Moreover, other parts (unillustrated) necessary for manufacturing the tire are wound and then cure-molding are performed with a bladder.

As a result of the cure-molding, an inner liner layer 10 is formed which includes the sheet 2, made of the thermoplastic resin or the thermoplastic elastomer composition obtained by blending the thermoplastic resin and the elastomer, and the tie rubber layer 3 as shown in the view in FIG. 4(b) as a model. Around the lap splice portion S, the sheet 2 made of the thermoplastic resin or the above-mentioned thermoplastic elastomer composition forms a portion which is exposed and a portion which is buried inside the tie rubber layer. This sheet 2 made of the thermoplastic resin or the above-mentioned thermoplastic elastomer composition constitutes an air permeation preventing layer 2a. In FIG. 4(b), the direction indicated by an arrow D is the tire circumferential direction.

The phenomenon in which the sheet 2 (air permeation preventing layer 2a) made of the above-mentioned thermoplastic resin or thermoplastic elastomer composition and the tie rubber layer 3 cured and adhered thereto are delaminated from each other after the tire starts to be used occurs particularly at a spot shown in FIG. 4(b) where the sheet 2 (air permeation preventing layer 2a) made of the thermoplastic resin or the thermoplastic elastomer composition is exposed and also in the vicinity 4 of the tip of the sheet 2 among others. In the beginning, a crack is developed between the sheet 2 (air permeation preventing layer 2a) made of the thermoplastic resin or the thermoplastic elastomer composition and the tie rubber layer 3, and the crack may further grow into the delamination phenomenon.

The reason for this phenomenon, specifically, the development of a crack between (on an interface of) the air permeation preventing layer 2a and the tie rubber layer 3 is considered to be attributable to the fact that the air permeation preventing layer 2a, formed of the sheet of the thermoplastic resin or the thermoplastic elastomer composition, usually has high rigidity. Accordingly, a portion of the tie rubber layer which is sandwiched vertically by ends of the air permeation preventing layer 2a is fixed and strain thereof is suppressed. On the other hand, strain cannot be suppressed at a portion of the tie rubber layer 3 in the vicinity 4 of the tip of the air permeation preventing layer 2a which is not sandwiched vertically by the ends of the air permeation preventing layer 2a and a large stress occurs as a consequence. Moreover, the crack, development is considered to be attributable to a situation where cure adhesion may not be sufficiently high between the sheet 2 of the thermoplastic resin or the thermoplastic elastomer composition and the tie rubber layer 3, and so on.

On the other hand, when the cure adhesion is sufficiently high between the sheet 2 of the thermoplastic resin or the thermoplastic elastomer composition and the tie rubber layer, strain by stress is concentrated on and around a spot inside the tie rubber layer 3 indicated by C in of FIG. 4(b), thereby frequently causing cracks. The strain by stress is concentrated on and around the above-mentioned spot indicated by C in FIG. 4(b) where the tie rubber layer 3 is exposed to the surface. For this reason, the strain by stress having the direction of strain in conformity to the tire circumferential direction is generated in the aforementioned spot in the tie rubber layer 3. This is considered as a cause of the development of a crack around the spot C in the tie rubber layer.

SUMMARY

In view of the above-mentioned circumstance, an object of the present invention is to provide a pneumatic tire which uses, as an inner liner layer, a laminated sheet obtained by laminating an air permeation preventing layer, made of any one of a thermoplastic resin and a thermoplastic elastomer composition containing a blend of the thermoplastic resin and an elastomer, and a tie rubber layer, and which has high durability making it possible to prevent development of a crack in the tie rubber layer that occurs around a splice portion of the laminated sheet after the tire starts to be used.

A pneumatic tire of the present invention to achieve the above-described object has a configuration of any one of a first aspect (1), a second aspect (2), and a third aspect (3) given below.

(1) A pneumatic tire which uses any one of a thermoplastic resin and a thermoplastic elastomer composition containing a blend of the thermoplastic resin and an elastomer for an air permeation preventing layer, characterized in that a concavo-convex structure is formed in the air permeation preventing layer at least between a point P and a point Q in such a shape that a length La of a straight line connecting the point P and the point Q and a length Lb of the air permeation preventing layer actually passing through the point P and the point Q satisfy a relationship of $(1.03 \times La) \leq Lb \leq (1.5 \times La)$, where the point P is a point at which a perpendicular line extending from a cavity-side end A of a splice portion of the air permeation preventing layer to the air permeation preventing layer on a non-cavity side intersects the air permeation preventing layer on the non-cavity side, and the point Q is a point at a position on the air permeation preventing layer away from the cavity-side end A of the splice portion of the air permeation preventing layer by 25 mm in a tire circumferential direction toward a position where the air permeation preventing layer on the non-cavity side is exposed.

(2) A pneumatic tire which uses any one of a thermoplastic resin and a thermoplastic elastomer composition containing a blend of the thermoplastic resin and an elastomer for an air permeation preventing layer, characterized in that a concavo-convex structure is formed in the air permeation preventing layer between a point A and a point R in such a shape that a length Xa of a straight line connecting the point A and the point R and a length Xb of the air permeation preventing layer actually passing through the point A and the point R satisfy a relationship of $(1.02 \times Xa) \leq Xb \leq (1.5 \times Xa)$, where the point R is a point at a position on the air permeation preventing layer away from a cavity-side end A of a splice portion of the air permeation preventing layer by 25 mm in a tire circumferential direction toward a position where the air permeation preventing layer 2a on a side of the end A is exposed.

(3) A pneumatic tire which uses any one of a thermoplastic resin and a thermoplastic elastomer composition containing a blend of the thermoplastic resin and an elastomer for an air permeation preventing layer, characterized in that the air permeation preventing layer comprises the concavo-convex structure according to in the above-described (1) formed between the point P and the point Q and the concavo-convex structure according to the above-described (2) formed between the point A and the point R.

It is preferable that the pneumatic tire of the present invention according to any one of (1) to (3) described above have a configuration of any one of (4) to (7) given below.

(4) The pneumatic tire according to any one of the above-described (1) to (3), characterized in that the concavo-convex structure designed to be formed in the air permeation preventing layer is formed when the pneumatic tire is manufactured by cure-molding using a bladder, by using a concavity-convexity shaping member between the bladder and the air permeation preventing layer, the concavity-convexity shaping member being made of at least a material selected from rubber, resin, and metal.

(5) The pneumatic tire according to any one of the above-described (1) to (4), characterized in that the concavo-convex structure is formed in the air permeation preventing layer inside regions covering a width of at least 60 mm respectively from both ends, in a tire widthwise direction, of one of belt layers with the largest belt width toward bead parts.

(6) The pneumatic tire according to the above-described (1) or (3), characterized in that the length La of the straight line connecting the point P and the point Q and the length Lb of the air permeation preventing layer satisfy a relationship of $(1.04 \times La) \leq Lb \leq (1.3 \times La)$.

(7) The pneumatic tire according to the above-described (2) or (3), characterized in that the length Xa of the straight line connecting the point A and the point R and the length Xb of the air permeation preventing layer satisfy a relationship of $(1.03 \times Xa) \leq Xb \leq (1.3 \times Xa)$.

According to the pneumatic tire of the present invention, it is possible to provide a pneumatic tire which uses, as an inner liner layer, a laminated sheet obtained by laminating an air permeation preventing layer, made of any one of a thermoplastic resin and a thermoplastic elastomer composition containing a blend of the thermoplastic resin and an elastomer, and a tie rubber layer, and which has high durability making it possible to prevent development of a crack in the tie rubber layer that occurs around a splice portion of the laminated sheet after the tire starts to be used.

The pneumatic tire of the present invention can further achieve that effect more securely at a higher level.

DETAILED DESCRIPTION OF EMBODIMENTS

Figure 1:
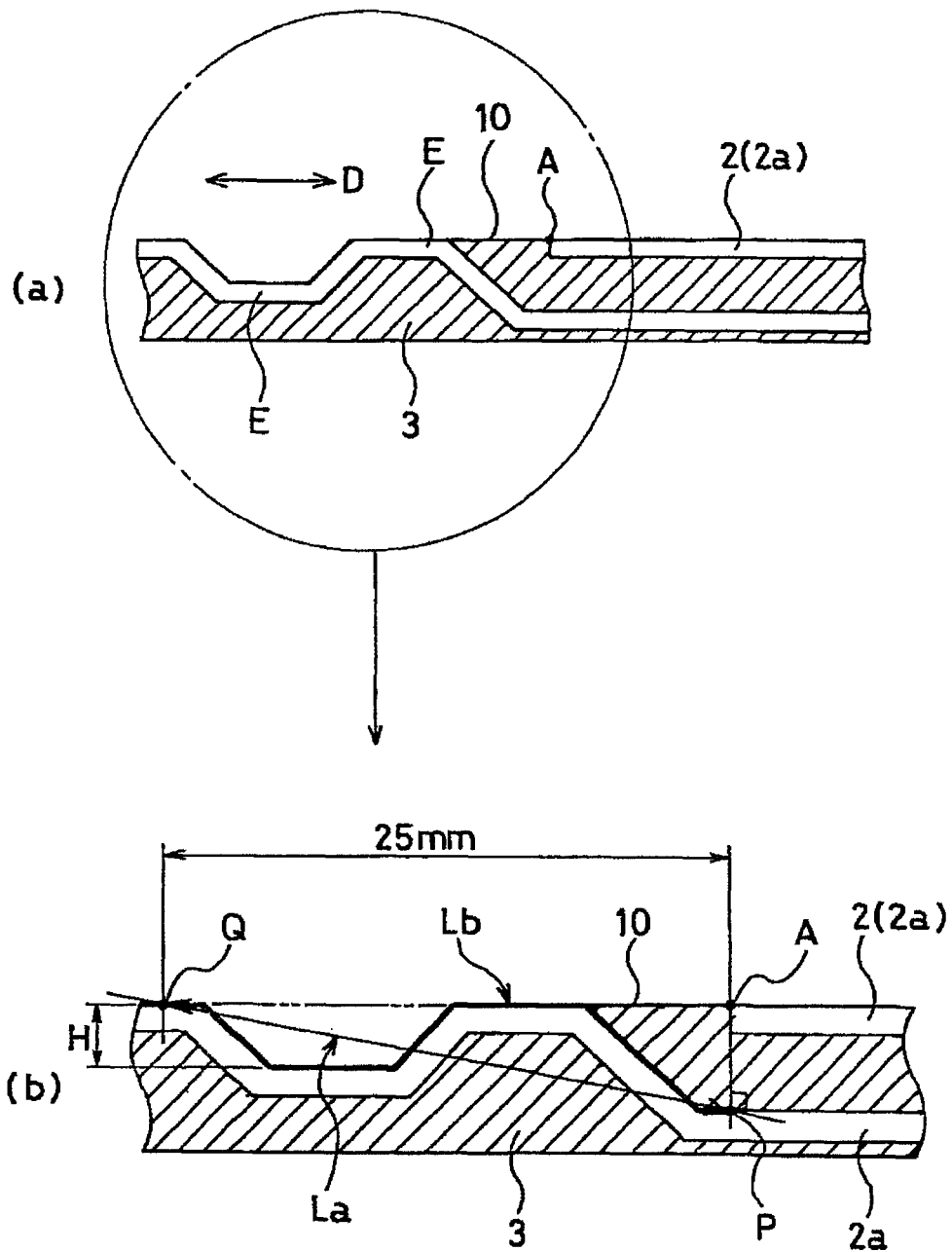
FIG. 1(a) is a side view showing, as a model, a state of an air permeation preventing layer and a tie rubber layer around a splice portion of an inner liner in a pneumatic tire according to a first embodiment of the present invention.
FIG. 1(b) is an enlarged view of a main part thereof.

Hereinbelow, pneumatic tires of first, second, and third embodiments of the present invention will be described further in detail by using the drawings and the like.

First Embodiment

As shown in FIGS. 1(a) and 1(b) as a model, the pneumatic tire of the first embodiment of the present invention is a pneumatic tire which uses any one of a thermoplastic resin and a thermoplastic elastomer composition containing a blend of the thermoplastic resin and an elastomer for an air permeation preventing layer 2a, and is characterized in that a concavo-convex structure E is formed in the air permeation preventing layer 2a at least between a point P and a point Q in such a shape that a length La of a straight line connecting the point P and the point Q and a length Lb of the air permeation preventing layer actually passing through the point P and the point Q satisfy a relationship of $(1.03 \times La) \leq Lb \leq (1.5 \times La)$, where the point P is a point at which a perpendicular line extending from a cavity-side end A of a splice portion of the air permeation preventing layer 2a to the air permeation preventing layer 2a on a non-cavity side intersects the air permeation preventing layer on the non-cavity side, and the point Q is a point at a position on the air permeation preventing layer 2a away from the cavity-side end A of the air permeation preventing layer 2a in the splice portion by 25 mm in a tire circumferential direction toward a position where the air permeation preventing layer 2a on the non-cavity side is exposed (in the leftward direction in FIGS. 1(a) and 1(b)).

In FIGS. 1(a) and 1(b), one convex portion and one concave portion are formed. Note that the concavo-convex structure in the present invention collectively means that any one of a concave portion, a convex portion, and both a concave portion and a convex portion are formed in the tire circumferential direction D as shown in FIGS. 1(a) and 1(b) and FIGS. 2(a) and 2(b) to be described later.

When the pneumatic tire is configured, by forming the concavo-convex structure in the air permeation preventing layer 2a as described above, the air permeation preventing layer 2a can be sagged, thereby making it possible to distribute the strain by stress concentrated on and generated at an end portion thereof and thus to relieve the strain. Accordingly, development of a crack inside the tie rubber layer can be prevented as much as possible. Setting Lb below the above-mentioned range is not preferable because the effects of the strain distribution and relief are small. Setting Lb greater than the above-mentioned range is not preferable either because such Lb does not provide an effect corresponding to the size and complicates the processing thereof. Particularly, to exhibit a greater effect, the air permeation preventing layer 2a is preferably configured such that the length La of the straight line connecting the point P and the point Q and the length Lb of the air permeation preventing layer satisfy a relationship of $(1.04 \times La) \leq Lb \leq (1.3 \times La)$. It is more preferably that a relationship of $(1.05 \times La) \leq Lb \leq (1.2 \times La)$ be satisfied.

In the present invention, it is preferable in the light of ease and certainly during the process of forming the concavo-convex structure as well as freedom in selecting the form of the concavo-convex structure, and so on, that when the pneumatic tire is manufactured through cure-molding with a bladder, the concavo-convex structure to be formed in the air permeation preventing layer 2a be manufactured by forming the concavo-convex structure simultaneously with the cure-molding by using a concavity-convexity shaping member in a place between the bladder and the air permeation preventing layer, the concavity-convexity shaping member being made of at least a material selected from rubber, resin, and metal.

The concavity-convexity shaping member is desirably configured as one combined with rubber when the member is made of resin or metal. For, example, the concavity-convexity shaping, member, is desirably configured as a laminate body of a resin and rubber, a wire (metal line) coated with rubber, or the like.

Although the concavo-convex structure shown as a model in FIGS. 1(a) and 1(b) has a trapezoidal shape in cross section in the tire circumferential direction, the shape is not particularly limited. Besides the illustrated one, the shape may be a semi-elliptical shape, a semi-circular shape, the semi-elliptical shape or semi-circular shape with a wave pattern, a rectangular shape with largely rounded corners, or the like, for example. A concavo-convex structure of a desired shape can be obtained in accordance with the shape of the concavity-convexity shaping member. As for the height of the concavity-convexity in the concavo-convex structure, a concavity-convexity height H shown in FIG. 1(a) is set preferably within a range of 0.1 to 2.0 mm and more preferably within an range of 0.5 to 1.0 mm.

The concavity-convexity shaping member is, as a whole, in the form of a sheet, tape, rope, window blind, net, or the like and preferably has a certain length in the tire widthwise direction and moderate flexibility. The concavity-convexity shaping member is preferably used by being attached to the air permeation preventing layer of the tire before the cure-molding, and may be detached from the tire after the cure-molding are finished. The concavo-convex shaping member is preferably made of rubber when the member is not intended to be detached.

Figure 5:
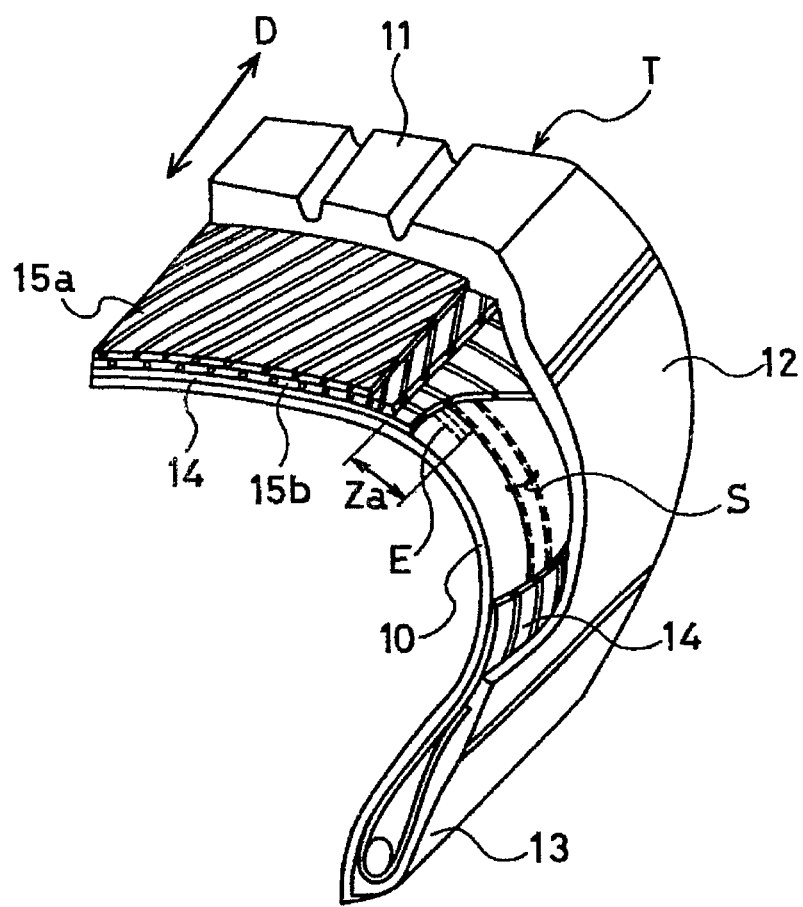
FIG. 5 is a partial cutaway perspective view showing an example of an embodiment of the pneumatic tire according to the present invention.

FIG. 5 is a partial cutaway perspective view showing an example of the embodiment of the pneumatic tire according to the present invention.

Figure 4:
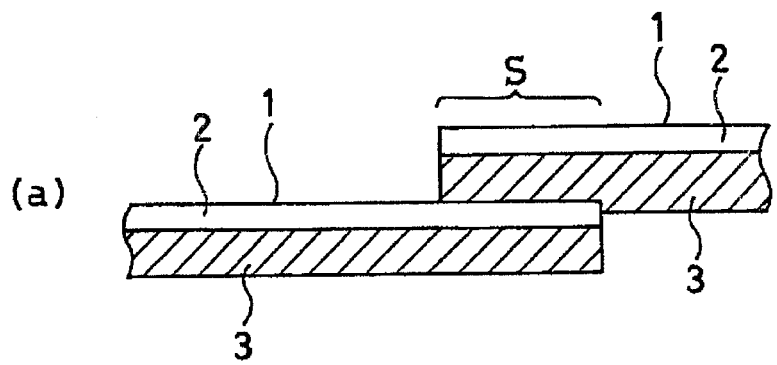
FIG. 4(a) is a view showing, as a model, a state where a laminated sheet 1 according to the present invention has both ends thereof being lap spliced together, the laminated sheet 1 being obtained by laminating a sheet 2, made of a thermoplastic resin or a thermoplastic elastomer composition, and rubber 3 to be cured and adhered to the thermoplastic resin or the thermoplastic elastomer composition, cutting the laminated sheet 1 at a predetermined length and winding the sheet 1 around a tire making drum, and of FIG. 4(b) is a view showing, as a model, a state after performing cure-molding in the state shown in FIG. 4(a)
Figure 4:
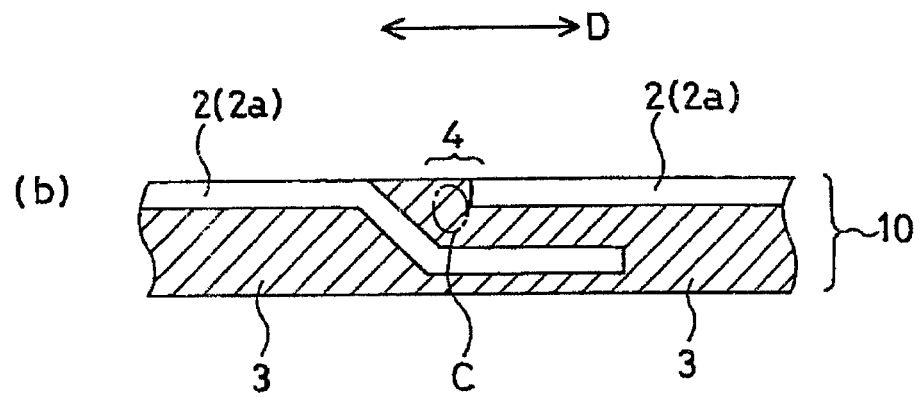

A pneumatic tire T includes a side wall part 12 and a bead part 13 in a continuous fashion on each of the left and right sides of a tread part 11. Inside the tire, a carcass layer 14 serving as the tire's framework is provided extending in the tire widthwise direction between the left and right bead parts 13 and 13. Two belt layers 15a and 15b made of steel cords are provided on the outer circumferential side of a portion of the carcass layer 4 corresponding to the tread part 11. An arrow D indicates the tire circumferential direction like FIGS. 1 and 4. An inner liner layer 10 is disposed on the inner side of the carcass layer 14, and a lap splice portion S thereof is present extending in the tire widthwise direction.

The concavo-convex structure of the air permeation preventing layer according to the present invention is preferably formed in the air permeation preventing layer 10 inside regions Za covering a width of at least 60 mm respectively from both ends, in the tire widthwise direction, of one of the belt layers with the largest belt width (15b in FIG. 5) toward the bead parts 13. This is because strain by stress is generated frequently in regions extending from portions near both ends of the belt layer, where the belt layer ends, toward the bead parts. Accordingly, the concavo-convex structure is preferably formed at least over the whole area of each 60 mm-width region Za.

The pneumatic tire according to the present invention suppresses the development of a crack in the tie rubber layer 3 on the tire's inner circumferential surface, which has been likely to develop, around the lap splice portion S. Moreover, since the strain by stress, around the lap splice portion S is relieved, such relief suppresses the development of a crack between the sheet 2, made of the thermoplastic resin or the thermoplastic elastomer composition, and the tie rubber layer 3 which collectively form the inner liner layer 10. Thus, the durability is significantly improved as a whole.

Second Embodiment

Figure 2:
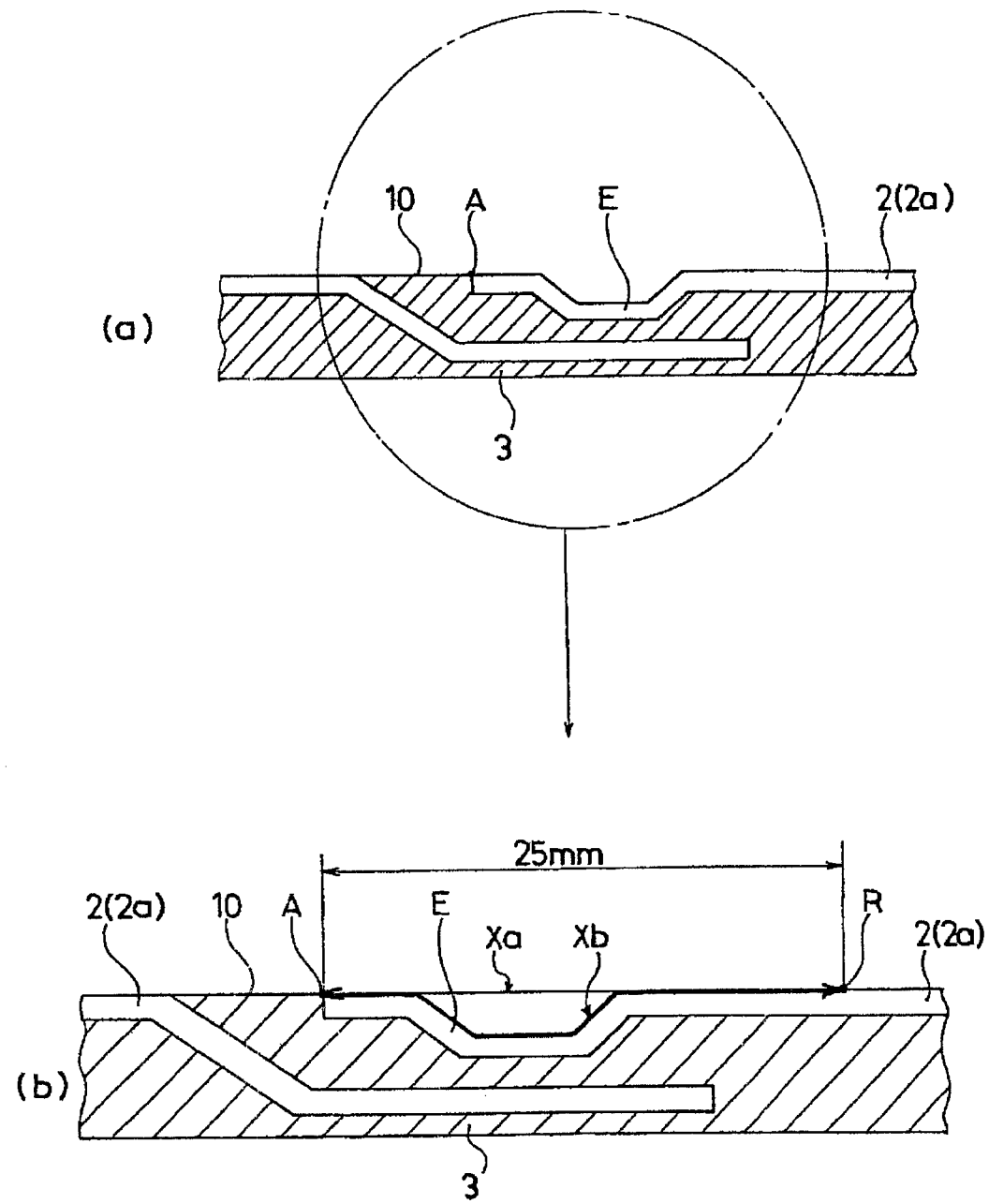
FIG. 2(a) is a side view showing, as a model, a state of an air permeation preventing layer and a tie rubber layer around a splice portion of an inner liner in a pneumatic tire according to a second embodiment of the present invention.
FIG. 2(b) is an enlarged view of a main part thereof.

As shown in FIGS. 2(a) and 2(b) as a model, the pneumatic tire of the second embodiment of the present invention is a pneumatic tire which uses any one of a thermoplastic resin and a thermoplastic elastomer composition containing a blend of the thermoplastic resin and an elastomer for an air permeation preventing layer, and is characterized in that a concavo-convex structure is formed in the air permeation preventing layer 2a between a point A and a point R in such a shape that a length Xa of a straight line connecting the point A and the point R and a length Xb of the air permeation preventing layer actually passing through the point A and the point R satisfy a relationship of $(1.02 \times Xa) \leq Xb \leq (1.5 \times Xa)$, where the point R is a point at a position on the air permeation preventing layer 2a away from a cavity-side end A of a splice portion of the air permeation preventing layer 2a by 25 mm in a tire circumferential direction toward a position where the air permeation preventing layer 2a on a side of the end A is exposed (in the rightward direction in FIGS. 2(a) and 2(b)). The point A in this second embodiment is the same as the point A in the first embodiment. The model in FIGS. 2(a) and 2(b) shows a state where one concave portion is formed.

In this second embodiment as well, the air permeation preventing layer 2a can be sagged by the concavo-convex structure in the air permeation preventing layer as similar to the first embodiment, thereby making it possible to distribute the strain by stress concentrated on and generated at an end portion thereof and thus to relieve the strain. As a result, the development of a crack inside the tie rubber layer can be prevented as much as possible. Setting Xb below the above-mentioned range is not preferable because the effects of the strain distribution and relief are small. Setting Xb greater than the above-mentioned range is not preferable either because such Xb does not provide an effect corresponding to the size and complicates the processing thereof. Particularly, to exhibit a greater effect, the air permeation preventing layer 2a is preferably configured to satisfy a relationship of $(1.03 \times Xa) \leq Xb \leq (1.3 \times Xa)$. In this second embodiment, the absolute value of the lower limit of the numerical range is set smaller than that of the first embodiment due to the fact that Xb in the second embodiment is smaller than Lb by the length of a path from the point P in FIG. 1(b) to where the air permeation preventing layer on the non-cavity side is exposed. It is more preferable that a relationship of $(1.04 \times Xa) \leq Xb \leq (1.2 \times Xa)$ be satisfied.

It is to be noted that the height and the method of forming the concavo-convex, structure, the form and materials of the concavity-convexity shaping member, and preference for formation of the concavo-convex structure at least within the region Za shown in FIG. 5, and so on discussed in the first embodiment similarly apply to the second embodiment.

Third Embodiment

Figure 3:
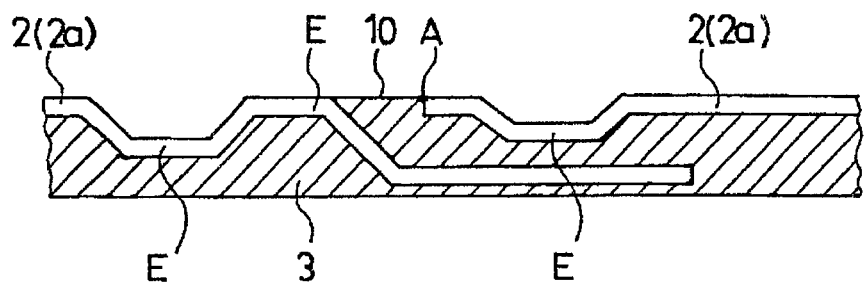
FIG. 3 is a side view showing, as a model, a state of an air permeation preventing layer and a tie rubber layer around a splice portion of an inner liner in a pneumatic tire according to a third embodiment of the present invention.

As shown in FIG. 3 as a model, the pneumatic tire of the third embodiment of the present invention is a pneumatic tire which uses any one of a thermoplastic resin and a thermoplastic elastomer composition containing a blend, of the thermoplastic resin and an elastomer for an air permeation preventing layer, and is characterized in that the air permeation preventing layer 2a has both of the concavo-convex structure of the above-described first embodiment formed between the point P and the point Q and the concavo-convex structure of the above-described second embodiment formed between the point A and the point R.

In this third embodiment, the two concavo-convex structures are present in the tire circumferential direction while interposing the point A on the air permeation preventing layer 2a therebetween similarly to the first and second embodiments. Thus, like the first and second embodiments, the air permeation preventing layer 2a can be sagged, thereby making it possible to distribute the strain by stress concentrated on and generated at an end portion thereof and thus to relieve the strain. As a result, the development of a crack inside the tie rubber layer can be well prevented. Specifically, in this third embodiment, distribution of the strain by stress or the strain relief can be achieved at both ends of the air permeation preventing layer 2a, so that it is possible to exhibit the effect of the strain relief at a higher level. It is to be noted that the height and the method of forming each concavo-convex structure, the form and materials of the concavity-convexity shaping member, and preference for formation of the concavo-convex structure at least within the region Za shown in FIG. 5, and so on discussed in the first embodiment and the second embodiment similarly apply to the third embodiment.

Common Features to First to Third Embodiments

Common features to the embodiments will be described below.

Examples of the thermoplastic resin usable preferably in the present invention include: polyamide-based resins [for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 9T, nylon 6/6T copolymers, nylon 66/PP copolymers, and nylon 66/PPS copolymers]; their N-alkoxyalkylates, for example, methoxymethylated nylon 6, methoxymethylated nylon 6/610 copolymers, and methoxymethylated nylon 612; polyester-based resins [for example, aromatic polyesters such as polybutylene terephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers]; polynitrile-based resins [for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers]; polymethacrylate-based resins [for example, polymethyl methacrylate (PMMA) and polyethylmethacrylate]; polyvinyl-based resins [for example, polyvinyl acetate, polyvinyl alcohol, (PVA), vinyl alcohol/ethylene copolymers (EVOH), polyvinylidene chloride (PVDC), polyvinyl chloride (PVC), vinyl chloride/ vinylidene chloride copolymers, vinylidene chloride/methyl acrylate copolymers, and vinylidene chloride/acrylonitrile copolymers (ETFE)]; cellulose-based resins [for example, cellulose acetate and cellulose acetate butyrate]; fluororesins [for example, polyvinylidene fluoride (PVDF), polyvinyl fluoride (PVF), polychlorofluoroethylene (PCTFE), and tetrafluoroethylene/ethylene copolymers]; imide-based resins [for example, aromatic polyimide (PI)]; and the like.

Moreover, as for the thermoplastic resin and the elastomer constituting the thermoplastic elastomer composition usable in the present invention, any of those described above can be used as the thermoplastic resin. Examples of the thermoplastic resin to be preferably used include: diene rubbers and their hydrogenated products [for example, natural rubbers (NR), isoprene rubber (IR), epoxidized natural rubbers, styrene-butadiene rubber (SBR), butadiene rubbers, (BR, high-cis BR, and low-cis BR), nitrile rubber (NBR), hydrogenated NBR, and hydrogenated SBR]; olefin-based rubbers [for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers]; halogen-containing rubbers [for example, Br-IIR, Cl-IIR, brominated isobutylene para-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)]; silicone rubbers [for example, methyl vinyl silicone rubber, dimethyl silicone rubber, and methylphenylvinyl silicone rubber]; sulfur-containing rubbers [for example, polysulfide rubber]; fluororubbers [for example, vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers]; thermoplastic elastomers [for example, styrene-based elastomers, olefin-based elastomers, ester-based elastomers, urethane-based elastomers, and polyamide-based elastomers]; and the like.

Moreover, at the time of blending in a combination of a specific one of the above-mentioned thermoplastic resins and a specific one of the above-mentioned elastomers, an appropriate compatibilizer may be used as a third component to make the thermoplastic resin and the elastomer compatible with each other if they are incompatible with each other. The interfacial tension between the thermoplastic resin and the elastomer decreases when such a compatibilizer is mixed in the blend system. As a result, the size of elastomer particles constituting the dispersion phase becomes finer. Accordingly, these two components exhibit their characteristics more effectively. In general, such a compatibilizer may have a copolymer structure including both or either of a structure of the thermoplastic resin and a structure of the elastomer, or a copolymer structure including an epoxy group, a carbonyl group, a halogen group, an amino group, an oxazoline group, or a hydroxyl group, which is capable of reacting with the thermoplastic resin or the elastomer. Such a compatibilizer may be selected depending on the types of the thermoplastic resin and the elastomer with which the compatibilizer is blended. Examples of the compatibilizer normally used include: styrene/ethylene-butylene block copolymers (SEBS) and their maleic acid-modified products; EPDM; EPM; EPDM/styrene or EPDM/acrylonitrile graft copolymers and their maleic acid-modified products; styrene/maleic acid copolymers; reactive phenoxine; and the like. The blending proportion of such a compatibilizer is not particularly limited, yet the blending proportion is preferably 0.5 to 10 parts by weight per 100 parts by weight of the polymer components (the total amount of the thermoplastic resin and the elastomer).

In the thermoplastic elastomer composition obtained by blending the thermoplastic resin and the elastomer, the composition ratio of the specific thermoplastic resin to the specific elastomer is not particularly limited. This composition ratio may be set as appropriate in order that the thermoplastic elastomer composition can have a structure in which the elastomer is dispersed as a discontinuous phase in the matrix of the thermoplastic resin. This composition ratio is preferably in a range of 90/10 to 30/70 in weight ratio.

In the present invention, the thermoplastic resin and the thermoplastic elastomer composition obtained by blending the thermoplastic resin and the elastomer may be mixed with other polymers such as the compatibilizer, as long as the other polymers do not impair the characteristics needed for the air permeation preventing layer. The purposes of mixing such other polymers are to improve the compatibility between the thermoplastic resin and the elastomer, to improve molding processability of the materials, to improve heat resistance, to reduce costs, and so on. Examples of materials used for such other polymers include polyethylene (PE), polypropylene (PP), polystyrene (PS), ABS, SBS, polycarbonate (PC), and the like. In addition, a filler (calcium carbonate, titanium oxide, alumina, or the like) generally blended in the polymer blend, a reinforcing agent such as carbon black and white carbon, a softener, a plasticizer, a processing aid, a pigment, a dye, an antioxidant, and the like may be blended optionally as long as the blended materials do not impair the characteristics needed for the inner liner. The thermoplastic elastomer composition has a structure in which the elastomer is dispersed as a discontinuous phase in the matrix of the thermoplastic resin. Having such a structure, this thermoplastic elastomer composition can provide the inner liner both with sufficient flexibility and with sufficient rigidity based on the effect of a resin layer as a continuous phase. At the same time, when this thermoplastic elastomer composition is molded, the thermoplastic elastomer composition can achieve the molding processability equivalent to that of the thermoplastic resin, regardless of the amount of the elastomer.

The Young's modulus of each of the thermoplastic resin and the elastomer usable in the present invention is not particularly limited, yet is set preferably to 1 to 500 MPa and more preferably to 50 to 500 MPa.

Note that in the present invention, the length Lb of the air permeation preventing layer actually passing through the point P and the point Q is obtained as a length on the cavity-side surface of the air permeation preventing layer (the bold line in Part (b) of FIG. 1) since the point P and the point Q are present on the cavity-side surface. Likewise, the length Xb of the air permeation preventing layer actually passing through the point A and the point R is obtained as a length on the cavity-side surface of the air permeation preventing layer (the bold line in FIG. 2(b)) since the point A and the point R are present on the cavity-side surface.

As described above, the present invention provides a pneumatic tire of the following configuration.

Specifically, the pneumatic tire provided by the present invention is a pneumatic tire which uses any one of a thermoplastic resin and a thermoplastic elastomer composition containing a blend of the thermoplastic resin and an elastomer for an air permeation preventing layer. In this pneumatic tire, a concavo-convex structure extending in the tire widthwise direction is formed within each of portions of the air permeation preventing layer 2a which extend from a cavity-side end A of a splice portion of the air permeation preventing layer by at least 25 mm both forward and rearward in the tire circumferential direction, respectively, or within a portion of the air permeation preventing layer 2a which extends from the cavity-side end A by at least 25 mm forwarder rearward in the tire circumferential direction. This concavo-convex structure forms a sagged structure in the above-mentioned portion or portions of the air permeation preventing layer 2a. By this sagged structure, strain by stress concentrated on and generated at an end portion of the air permeation preventing layer 2a is distributed and relieved. Accordingly, the development of a crack inside the tie rubber layer around the splice portion is well prevented.

EXAMPLES

Hereinbelow, the pneumatic tire of the present invention will be described specifically with reference to examples and the like.

Note, that the durability of each pneumatic tire was evaluated by observing a condition of development of a crack in the tie rubber around the splice portion of the inner liner layer in the cavity of the test tire.

The effect on durability was judged by sorting the results as follows: "x: fail" was given to one that developed at least one visually-recognizable crack, while "○: pass" was given to one that did not develop any cracks.

The processability of the tire was evaluated by the number of concave portions. In each Example, concavities/convexities were formed by attaching rubber sheets onto the air permeation preventing layer before the cure-molding of the tire. Hence, an increase in the number of concave portions leads to an increase in the number of rubber sheets to be attached, and results in more complicated processing.

Examples of First Embodiment

Examples 1 to 6 and Comparative Example 1

As each test tire, 215/70R15 having a tire structure with two belt layers and two carcass layers was prepared. Two tires were prepared for each Example and Comparative Example. Each tire was mounted, on a standard rim specified in JATMA and subjected to a running test under a forced condition on a metal drum with a tire inner pressure of 240 kPa and application of an extremely large load of 7.35 kN. The running speed was set to 80 km/h and the running distance was set to 50,000 km.

In each of the test tires of Examples 1 to 6, the concavo-convex structure formed in the air permeation preventing layer was a concavo-convex structure of a semi-elliptical shape (each concave portion extends in the tire widthwise direction). When they were formed, the thickness of each rubber sheet attached to the tire before cure-molding and the number thereof were varied to change the height H of the concavity and the number thereof, and thereby to set the length Lb variously. The regions in which the concavo-convex structure was provided were provided as regions covering a width of 60 mm respectively from both ends, in the tire widthwise direction, of one of the belt layers with the largest belt width toward the bead parts.

Table 1 shows details of the respective, test tires and results of the durability evaluation.

As can be seen from Table 1, the tires according to the first embodiment of the present invention have no crack development and have excellent durability.

TABLE 1

|  | Comparative Example 1 | Example 1 | Example 2 | Example 3 | Example 4 | Example 5 | Example 6 |
|---|---|---|---|---|---|---|---|
| Thickness of Air permeation Preventing Layer (mm) | 0.1 | 0.1 | 0.1 | 0.1 | 0.1 | 0.1 | 0.1 |
| Thickness of Tie Rubber Layer (mm) | 0.7 | 0.7 | 0.7 | 0.7 | 0.7 | 0.7 | 0.7 |
| Presence of Concavo-convex Structure in Air Permeation Preventing Layer | Not present | Present | Present | Present | Present | Present | Present |
| Length La of Straight Line Connecting Point P and Point Q (mm) | 25.01 | 25.01 | 25.01 | 25.01 | 25.01 | 25.01 | 25.01 |
| Length Lb of Air Permeation Preventing Layer Passing through Point P and Point Q (mm) | 25.4 | 25.8 | 26.0 | 26.3 | 30.0 | 32.5 | 37.5 |
| Ratio of (Lb/La) | 1.02 | 1.03 | 1.04 | 1.05 | 1.20 | 1.30 | 1.50 |
| Number of Concavities and Convexities (Processability) | 0 | 1 | 1 | 1 | 2 | 3 | 4 |
| Result of Evaluation of Durability Test | X | ○ | ○ | ○ | ○ | ○ | ○ |

Examples of Second Embodiment

Examples 7 to 12 and Comparative Example 2

In each of test tires of Examples 7 to 12, the concavo-convex structure formed in the air permeation preventing layer was a concave structure of a semi-elliptical shape (each concave portion extends in the tire widthwise direction). The other features were the same as Examples of the first embodiment.

Table 2 shows details of the respective test tires and the result of the durability evaluation.

As can be seen from Table 2, the tires according to the second embodiment of the present invention have no crack development and have excellent durability.

TABLE 2

| | Comparative Example 2 | Example 7 | Example 8 | Example 9 | Example 10 | Example 11 | Example 12 |
|---|---|---|---|---|---|---|---|
| Thickness of Air permeation Preventing Layer (mm) | 0.1 | 0.1 | 0.1 | 0.1 | 0.1 | 0.1 | 0.1 |
| Thickness of Tie Rubber Layer (mm) | 0.7 | 0.7 | 0.7 | 0.7 | 0.7 | 0.7 | 0.7 |
| Presence of Concave-convex Structure in Air Permeation Preventing Layer | Not present | Present | Present | Present | Present | Present | Present |
| Length Xa of Straight Line Connecting Point A and Point R (mm) | 25.0 | 25.0 | 25.0 | 25.0 | 25.0 | 25.0 | 25.0 |
| Length Xb of Air Permeation Preventing Layer Passing through Point A and Point R (mm) | 25.3 | 25.5 | 25.8 | 26.3 | 30.0 | 32.5 | 37.5 |
| Ratio of (Xb/Xa) | 1.01 | 1.02 | 1.03 | 1.05 | 1.20 | 1.30 | 1.50 |
| Number of Concavities (Processability) | 0 | 1 | 1 | 1 | 2 | 3 | 4 |
| Result of Evaluation of Durability Test | X | ◯ | ◯ | ◯ | ◯ | ◯ | ◯ |

Example of Third Embodiment

Example 13

Both of the first embodiment and the second embodiment of the present invention were implemented in a single test tire. In the implementation, the concavo-convex structures formed in the air permeation preventing layer were similar to Example 3 in terms of the first embodiment of the present invention and Example 9 in terms of the second embodiment. The result of the durability test was "◯" and could be judged as superior to those of Examples 3 and 9 (both evaluated as "◯").

The invention claimed is:

1. A pneumatic tire comprising:
one of a thermoplastic resin and a thermoplastic elastomer composition containing a blend of the thermoplastic resin and an elastomer for an air permeation preventing layer, such that a concavo-convex structure, including at least one of a concave portion and a convex portion, is formed in the air permeation preventing layer at least between a point P and a point Q in such a shape that a length La of a straight line connecting the point P and the point Q and a length Lb of the air permeation preventing layer actually passing through the point P and the point Q satisfy a relationship of $(1.03 \times La) \leq Lb \leq (1.5 \times La)$, where the point P is a point at which a perpendicular line extending from a cavity-side end A of a splice portion of the air permeation preventing layer to the air permeation preventing layer on a non-cavity side intersects the air permeation preventing layer on the non-cavity side, and the point Q is a point at a position on the air permeation preventing layer away from the cavity-side end A of the splice portion of the air permeation preventing layer by 25 mm in a first direction of a tire circumferential direction toward a position where the air permeation preventing layer on the non-cavity side is exposed.

2. A pneumatic tire comprising:
one of a thermoplastic resin and a thermoplastic elastomer composition containing a blend of the thermoplastic resin and an elastomer for an air permeation preventing layer, such that a concavo-convex structure, including at least one of a concave portion and a convex portion, is formed in the air permeation preventing layer between a point A and a point R in such a shape that a length Xa of a straight line connecting the point A and the point R and a length Xb of the air permeation preventing layer actually passing through the point A and the point R satisfy a relationship of $(1.02 \times Xa) \leq Xb \leq (1.5 \times Xa)$, where the point R is a point at a position on the air permeation preventing layer away from a cavity-side end A of a splice portion of the air permeation preventing layer by 25 mm in a tire circumferential direction opposite to a first direction of the tire circumferential direction which is toward a position where the air permeation preventing layer on a non-cavity side is exposed.

3. A pneumatic tire comprising:
one of a thermoplastic resin and a thermoplastic elastomer composition containing a blend of the thermoplastic resin and an elastomer for an air permeation preventing layer, such that the air permeation preventing layer comprises
a concavo-convex structure, including at least one of a concave portion and a convex portion, formed in the air permeation preventing layer at least between a point P and a point Q in such a shape that a length La of a straight line connecting the point P and the point Q and a length Lb of the air permeation preventing layer actually passing through the point P and the point Q satisfy a relationship of $(1.03 \times La) \leq Lb \leq (1.5 \times La)$, where the point P is a point at which a perpendicular line extending from a cavity-side end A of a splice portion of the air permeation preventing layer to the air permeation preventing layer on a non-cavity side intersects the air permeation preventing layer on the non-cavity side, and the point Q is a point at a position on the air permeation preventing layer away from the cavity-side end A of the splice portion of the air permeation preventing layer by 25 mm in a first direction of a tire circumferential direction toward a position where the air permeation preventing layer on the non-cavity side is exposed; and a concavo-convex structure, including at least one of a concave portion and a convex portion, formed in the air permeation preventing layer between a point A and a point R in such a shape that a length Xa of a straight line connecting the point A and the point R and a length Xb of the air permeation preventing layer actually passing through the point A and the point R satisfy a relationship of $(1.02 \times Xa) \leq Xb \leq (1.5 \times Xa)$, where the point R is a point at a position on the air permeation preventing layer away from a cavity-side end A of a splice portion of the air permeation preventing layer by 25 mm in a tire circumferential direction opposite to the first direction.

4. The pneumatic tire according to claim 1 wherein
the concavo-convex structure designed to be formed in the air permeation preventing layer is formed when the pneumatic tire is manufactured by cure-molding using a bladder, by using a concavity-convexity shaping member between the bladder and the air permeation preventing layer, the concavity-convexity shaping member being made of at least a material selected from rubber, resin, and metal.

5. The pneumatic tire according to claim 1, wherein the concavo-convex structure is formed in the air permeation preventing layer inside regions covering a width of at least 60 mm respectively from both ends, in a tire widthwise direction, of one of belt layers with the largest belt width toward bead parts.

6. The pneumatic tire according to claim 1, wherein the length La of the straight line connecting the point P and the point Q and the length Lb of the air permeation preventing layer satisfy a relationship of $(1.04 \times La) \leq Lb \leq (1.3 \times La)$.

7. The pneumatic tire according to claim 2, wherein the length Xa of the straight line connecting the point A and the point R and the length Xb of the air permeation preventing layer satisfy a relationship of $(1.03 \times Xa) \leq Xb \leq (1.3 \times Xa)$.

8. The pneumatic tire according to claim 2, wherein the concavo-convex structure designed to be formed in the air permeation preventing layer is formed when the pneumatic tire is manufactured by cure-molding using a bladder, by using a concavity-convexity shaping member between the bladder and the air permeation preventing layer, the concavity-convexity shaping member being made of at least a material selected from rubber, resin, and metal.

9. The pneumatic tire according to claim 3, wherein the concavo-convex structure designed to be formed in the air permeation preventing layer is formed when the pneumatic tire is manufactured by cure-molding using a bladder, by using a concavity-convexity shaping member between the bladder and the air permeation preventing layer, the concavity-convexity shaping member being made of at least a material selected from rubber, resin, and metal.

10. The pneumatic tire according to claim 2, wherein the concavo-convex structure is formed in the air permeation preventing layer inside regions covering a width of at least 60 mm respectively from both ends, in a tire widthwise direction, of one of belt layers with the largest belt width toward bead parts.

11. The pneumatic tire according to claim 3, wherein the concavo-convex structure is formed in the air permeation preventing layer inside regions covering a width of at least 60 mm respectively from both ends, in a tire widthwise direction, of one of belt layers with the largest belt width toward bead parts.

12. The pneumatic tire according to claim 4, wherein the concavo-convex structure is formed in the air permeation preventing layer inside regions covering a width of at least 60 mm respectively from both ends, in a tire widthwise direction, of one of belt layers with the largest belt width toward bead parts.

13. The pneumatic tire according to claim 2, wherein the length La of the straight line connecting the point P and the point Q and the length Lb of the air permeation preventing layer satisfy a relationship of $(1.04 \times La) \leq Lb \leq (1.3 \times La)$.

14. The pneumatic tire according to claim 3, wherein the length La of the straight line connecting the point P and the point Q and the length Lb of the air permeation preventing layer satisfy a relationship of $(1.04 \times La) \leq Lb \leq (1.3 \times La)$.

15. The pneumatic tire according to claim 4, wherein the length La of the straight line connecting the point P and the point Q and the length Lb of the air permeation preventing layer satisfy a relationship of $(1.04 \times La) \leq Lb \leq (1.3 \times La)$.

16. The pneumatic tire according to claim 5, wherein the length La of the straight line connecting the point P and the point Q and the length Lb of the air permeation preventing layer satisfy a relationship of $(1.04 \times La) \leq Lb \leq (1.3 \times La)$.

17. The pneumatic tire according to claim 1, wherein the length Xa of the straight line connecting the point A and the point R and the length Xb of the air permeation preventing layer satisfy a relationship of $(1.03 \times Xa) \leq Xb \leq (1.3 \times Xa)$.

18. The pneumatic tire according to claim 3, wherein the length Xa of the straight line connecting the point A and the point R and the length Xb of the air permeation preventing layer satisfy a relationship of $(1.03 \times Xa) \leq Xb \leq (1.3 \times Xa)$.

19. The pneumatic tire according to claim 4, wherein the length Xa of the straight line connecting the point A and the point R and the length Xb of the air permeation preventing layer satisfy a relationship of $(1.03 \times Xa) \leq Xb \leq (1.3 \times Xa)$.

20. The pneumatic tire according to claim 5, wherein the length Xa of the straight line connecting the point A and the point R and the length Xb of the air permeation preventing layer satisfy a relationship of $(1.03 \times Xa) \leq Xb \leq (1.3 \times Xa)$.

* * * * *